(12) United States Patent
Gregory et al.

(10) Patent No.: US 12,449,080 B2
(45) Date of Patent: Oct. 21, 2025

(54) PIPE-IN-PIPE OUTER PIPELINE SEALING SYSTEMS AND METHODS

(71) Applicant: FlexSteel Pipeline Technologies, LLC, Houston, TX (US)

(72) Inventors: David Michael Gregory, Houston, TX (US); Matthew Allen Hegler, Kingwood, TX (US)

(73) Assignee: FlexSteel USA, LLC, Houston, TX (US)

( * ) Notice: Subject to any disclaimer, the term of this patent is extended or adjusted under 35 U.S.C. 154(b) by 157 days.

(21) Appl. No.: 18/318,134

(22) Filed: May 16, 2023

(65) Prior Publication Data

US 2023/0375120 A1 Nov. 23, 2023

Related U.S. Application Data (60) Provisional application No. 63/343,340, filed on May 18, 2022.

(51) Int. Cl.
*F16L 39/00* (2006.01)
*F16L 25/00* (2006.01)

(52) U.S. Cl.
CPC ......... *F16L 39/005* (2013.01); *F16L 25/0081* (2013.01)

(58) Field of Classification Search
CPC ......... F16L 39/005; F16L 33/01; F16L 23/02; F16L 23/18
See application file for complete search history.

(56) References Cited

U.S. PATENT DOCUMENTS

| | | | |
|---|---|---|---|
| 3,317,221 A | 5/1967 | Brown | |
| 8,308,200 B1 * | 11/2012 | Barnes | F16L 39/005 |
| 8,820,794 B1 | 9/2014 | Betz | |
| 11,402,050 B1 * | 8/2022 | Francis | F16L 23/02 |
| 2007/0024007 A1 * | 2/2007 | Putch | F16L 23/18 |
| 2008/0258407 A1 * | 10/2008 | Schimanski | F16L 21/03 |

(Continued)

FOREIGN PATENT DOCUMENTS

WO WO-0223078 A1 * 3/2002 ............ F16L 39/005

OTHER PUBLICATIONS

PCT International Search Report; Application No. PCT/US2023/022778; dated Sep. 29, 2023.

(Continued)

*Primary Examiner* — Zachary T Dragicevich
(74) *Attorney, Agent, or Firm* — Conrad J. Hsu (57) ABSTRACT

Techniques for implementing and/or operating a system that includes an outer pipeline, an inner pipeline, and an outer pipeline sealing mechanism. The outer pipeline includes an outer pipe fitting to be secured to an end of an outer pipe segment. The inner pipeline includes an inner pipe fitting to be secured to another end of an inner pipe segment. The outer pipeline sealing mechanism includes a sealing plate to be secured to the outer pipe fitting; a sealing stem that extends out axially from the sealing plate, in which the sealing stem is to be secured to the inner pipe fitting to facilitate sealing an inner pipeline bore from an outer pipeline bore; and a seal ring to be compressed between the sealing plate and the outer pipe fitting to facilitate sealing the outer pipeline bore of the outer pipeline from external environmental conditions.

20 Claims, 8 Drawing Sheets

(56) References Cited

U.S. PATENT DOCUMENTS

| | | |
|---|---|---|
| 2009/0145506 A1 | 6/2009 | Queau |
| 2013/0160886 A1 | 6/2013 | Wright |
| 2015/0369413 A1 | 12/2015 | Dill |
| 2021/0254771 A1* | 8/2021 | Schulz ................. F16L 39/005 |

OTHER PUBLICATIONS

E&B Natural Resources, E&B Leak Detector Ass'y, Feb. 12, 2018.
E&B Natural Resources, E&B—Shell Tie-in, Mar. 12, 2018.
PCT Article 17(3)(a) and Rules 40.I and 40.2(e); Application No. PCT/US2023/022778; dated Jul. 19, 2023.

* cited by examiner

PIPE-IN-PIPE OUTER PIPELINE SEALING SYSTEMS AND METHODS

CROSS-REFERENCE

The present disclosure claims priority to and benefit of U.S. Provisional Application No. 63/343,340, entitled "PIPE-IN-PIPE OUTER PIPELINE SEALING SYSTEMS AND METHODS," filed May 18, 2022, which is incorporated herein by reference in its entirety for all purposes.

BACKGROUND

The present disclosure generally relates to pipeline systems and, more particularly, to techniques for sealing a pipeline bore of an outer (e.g., carrier and/or host) pipeline around an inner (e.g., rehab and/or flexible) pipeline that is disposed and terminated therein, for example, during pipe-in-pipe rehabilitation.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one embodiments, a system includes an outer pipeline, an inner pipeline to be disposed within an outer pipeline bore of the outer pipeline, and an outer pipeline sealing mechanism. The outer pipeline includes an outer pipe segment and an outer pipe fitting to be secured to an end of the outer pipe segment. The inner pipeline includes an inner pipe segment and an inner pipe fitting to be secured to another end of the inner pipe segment. The outer pipeline sealing mechanism includes a sealing plate to be secured to an outer fitting connector of the outer pipe fitting; a sealing stem that extends out axially from the sealing plate, in which the sealing stem is to be secured to an inner fitting connector of the inner pipe fitting to facilitate sealing an inner pipeline bore of the inner pipeline from the outer pipeline bore of the outer pipeline; and a seal ring to be compressed between the sealing plate and the outer fitting connector of the outer pipe fitting to facilitate sealing the outer pipeline bore of the outer pipeline from external environmental conditions.

In another embodiment, a method includes disposing an inner pipeline within an outer pipeline bore of an outer pipeline; flowing hardening material in a fluid state into the outer pipeline bore such that the hardening material circumferentially engages an outer surface of the inner pipeline and an inner surface of the outer pipeline; and transitioning the hardening material from the fluid state to a solid state to form an outer pipeline sealing mechanism that seals the outer pipeline bore of the outer pipeline from an inner pipeline bore of the inner pipeline as well as external environmental conditions.

In a further embodiment, a system includes an outer pipeline sealing mechanism. The outer pipeline sealing mechanism includes a sealing plate to be secured to an outer fitting connector of an outer pipe fitting at an end of an outer pipeline to facilitate sealing an outer pipeline bore of the outer pipeline from external environmental conditions; a body that extends axially out from the sealing plate to enable the body to be inserted into the outer pipeline bore of the outer pipeline toward an inner pipeline disposed within the outer pipeline bore of the outer pipeline, in which a bore extends through the body and the sealing plate; and a jacket secured circumferentially around the body such that the jacket extends axially along the body to define a tubing cavity, in which the jacket is to be conformally deformed around tubing of an inner pipe segment in the inner pipeline to facilitate securing the outer pipeline sealing mechanism to the inner pipeline such that an inner pipeline bore of the inner pipeline is fluidly connected to the bore in the outer pipeline sealing mechanism and sealed from the outer pipeline bore of the outer pipeline.

DETAILED DESCRIPTION

One or more specific embodiments of the present disclosure will be described below with reference to the figures. Wherever possible, like or identical reference numerals are used in the figures to identify common or the same features. The figures are not necessarily to scale. In particular, certain features and/or certain views of the figures may be shown exaggerated in scale for purposes of clarification.

Figure 1:
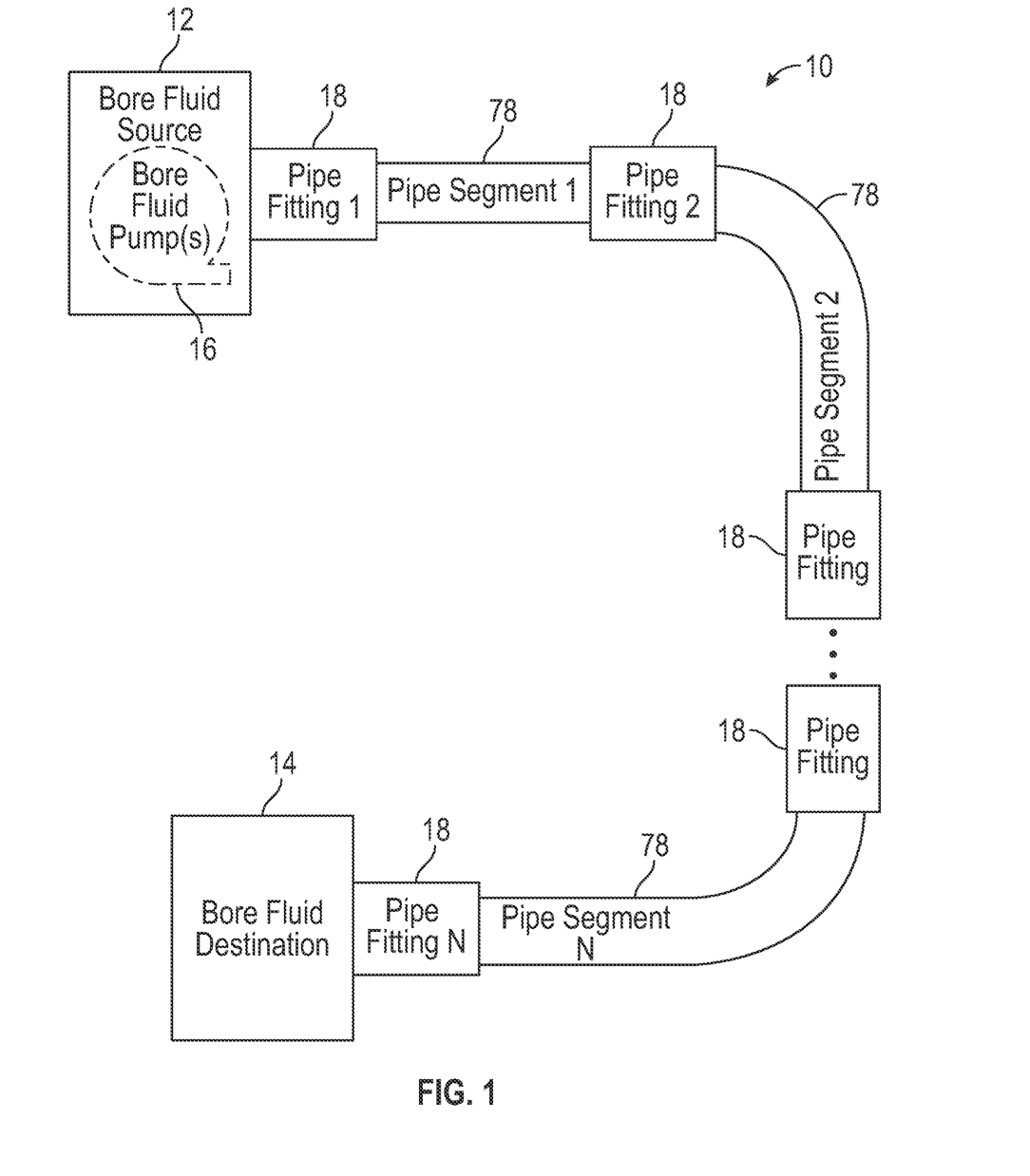
FIG. 1 is a block diagram of an example of a system including a pipeline that includes pipe segments and pipe fittings, in accordance with an embodiment of the present disclosure.

The present disclosure generally relates to pipelines. To help illustrate, an example of a system that includes a pipeline 10 is shown in FIG. 1. Pipelines 10 are generally used to facilitate transporting fluid (e.g., liquid and/or gas) from a bore fluid source 12 to a bore fluid destination 14. To facilitate transporting fluid, pipelines 10 generally include one or more pipe segments 78 and pipe fittings 18, which are used to connect a pipe segment 78 to another pipeline component, such as a bore fluid source 12, a bore fluid destination 14, another pipe segment 78, or another pipe fitting 18. In some embodiments, a pipe segment 78 in a pipeline 10 may be a flexible pipe 20.

Figure 2:
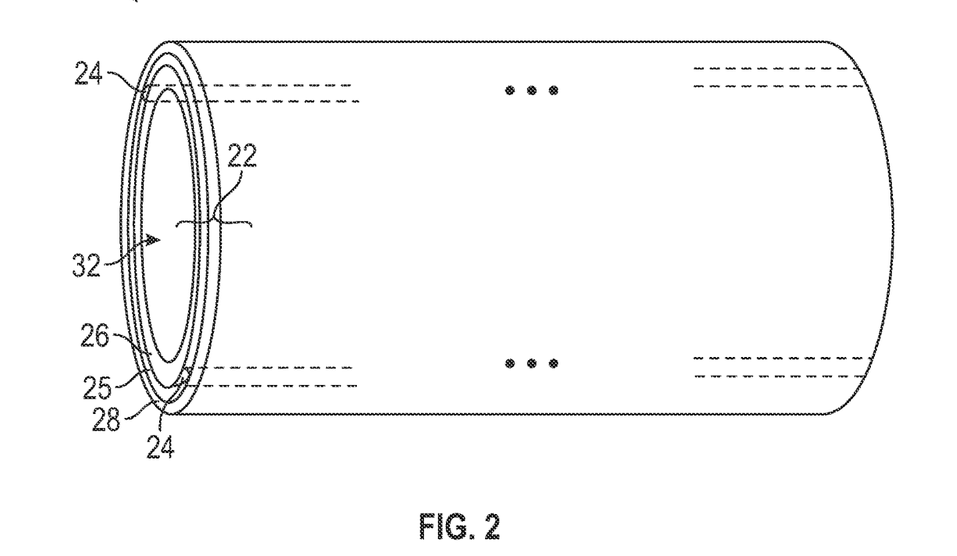
FIG. 2 is a side view of an example of a flexible pipe that includes tubing that defines a pipe bore as well as fluid conduits within a tubing annulus, in accordance with an embodiment of the present disclosure

To help illustrate, an example of a flexible pipe 20 is shown in FIG. 2. As in the depicted example, tubing 22 of a flexible pipe 20 generally includes an inner barrier layer 26, which defines a pipe bore 32, an outer barrier layer 28, and one or more intermediate layers 34 between the inner barrier layer 26 and the outer barrier layer 28 and, thus, within a tubing annulus 25 of the flexible pipe 20. In particular, as in the depicted example, to facilitate improving pipe flexibility, in some embodiments, a flexible pipe 20 may include one or more annular (e.g., internal) fluid conduits (e.g., open space) 24 defined within its tubing annulus 25.

Figure 3:
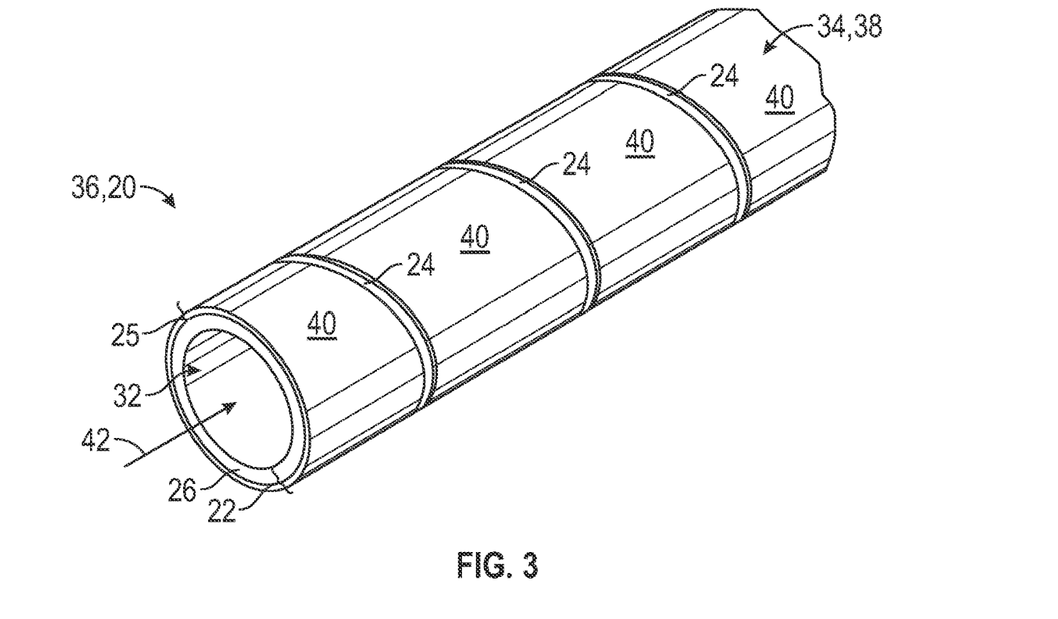
FIG. 3 is a perspective view of a portion of a flexible pipe that includes a helically shaped fluid conduit defined within its tubing annulus, in accordance with an embodiment of the present disclosure.

To help illustrate, an example of a portion 36 of a flexible pipe 20 is shown in FIG. 3. The depicted portion 36 of the flexible pipe 20 includes an inner barrier layer 26 and an intermediate layer 34—namely a reinforcement layer 38, which facilitates improving hoop strength and/or tensile strength of the flexible pipe 20. In particular, in the depicted example, the reinforcement layer 38 includes a reinforcement strip 40, which is helically wrapped on the inner barrier layer 26 such that open space is left between neighboring wraps to facilitate defining a helically-shaped annular fluid conduit 24 within the tubing annulus 25 of the flexible pipe 20. To facilitate improving tensile strength and/or hoop strength, in some embodiments, a reinforcement strip 40 in a reinforcement layer 38 of a flexible pipe 20 may be material that has a higher tensile strength and/or a higher hoop strength as compared to material of the inner barrier layer 26 and/or the outer barrier layer 28 of the pipe segment 78. For example, the inner barrier layer 26 and/or the outer barrier layer 28 of a pipe segment 78 may be plastic, such as high-density polyethylene (HDPE), while a reinforcement strip 40 in a reinforcement layer 38 of the pipe segment 78 is composite material and/or metal, such as carbon steel, stainless steel, duplex stainless steel, super duplex stainless steel, or any combination thereof.

However, it should be appreciated that the depicted example is merely intended to be illustrative and not limiting. In particular, in addition to a reinforcement layer 38, in some embodiments, a flexible pipe 20 may include one or more other types of intermediate layers 34, such as an intermediate tape layer 34 and/or an intermediate barrier layer 34. Additionally or alternatively, in some embodiments, a flexible pipe 20 may include multiple (e.g., four) reinforcement layers 38 in its tubing annulus 25. Furthermore, in other embodiments, a reinforcement layer 38 in a flexible pipe 20 may include multiple (e.g., four) reinforcement strips 40.

In any case, in some instances, an aging, faulty, or otherwise unsuitable (e.g., steel) pipeline 10 may be rehabilitated at least in part by disposing another (e.g., new, inner, rehab and/or flexible) pipeline 10 within its pipeline bore to form a pipe-in-pipe system.

Figure 4:
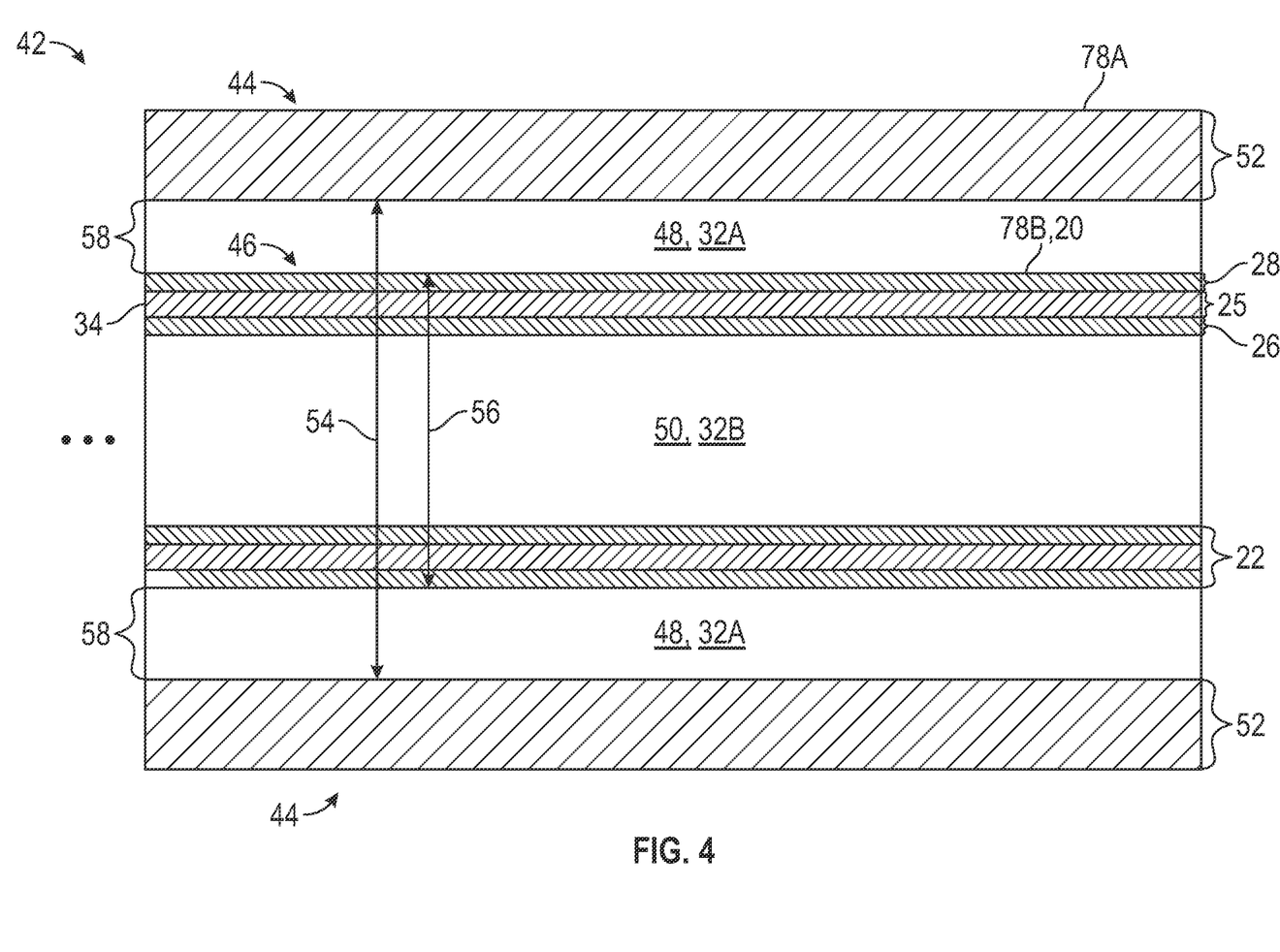
FIG. 4 is an axial cross-section of an example of a central portion of a pipe-in-pipe system, in accordance with an embodiment of the present disclosure.

To help illustrate, an example of a (e.g., central) portion 42 of a pipe-in-pipe system is shown in FIG. 4. As in the depicted example, a pipe-in-pipe system generally includes multiple pipelines 10—namely an outer (e.g., host and/or carrier) pipeline 44 and an inner (e.g., rehab and/or flexible) pipeline 46, which is disposed within an outer pipeline bore 48 of the outer pipeline 44. In particular, as in the depicted example, an outer pipeline 44 generally includes one or more outer (e.g., host and/or carrier) pipe segments 78A while an inner pipeline 46 generally includes one or more inner (e.g., rehab and/or flexible) pipe segments 78B, for example, in addition to one or more outer (e.g., host and/or carrier) pipe fittings 18 and/or one or more inner (e.g., rehab) pipe fittings 18, respectively. In other words, as in the depicted example, an outer (e.g., carrier and/or host) pipeline bore 48 of an outer pipeline 44 generally includes the pipe bore 32A of each outer pipe segment 78A in the outer pipeline 44 while an inner (e.g., rehab) pipeline bore 50 of an inner pipeline 46 generally includes the pipe bore 32B of each inner pipe segment 78B in the inner pipeline 46, for example, in addition to a fitting bore of each outer pipe fitting 18 in the outer pipeline 44 and/or a fitting bore of each inner pipe fitting 18 in the inner pipeline 46, respectively.

Additionally, as in the depicted example, in some embodiments, the tubing 52 of an outer pipe segment 78A in an outer pipeline 44 may include a single layer of solid material, such as metal or plastic. For example, in some such embodiments, an outer pipe segment 78A in an outer pipeline 44 may be a metal pipe segment 78 and, thus, rigid. Nevertheless, in some instances, an outer pipeline 44 may include a bend and/or a curve, for example, at an elbow pipe fitting 18 and/or due to an outer pipe segment 78A being bent or curved.

Furthermore, in some instances, an inner pipeline 46 may be disposed within an outer pipeline bore 48 of an outer pipeline 44 at least in part by pulling the inner pipeline 46 into and/or through the outer pipeline bore 48, for example, using a pull head secured to the inner pipeline 46. Since an outer pipeline 44 may include a bend and/or a curve, as in the depicted example, to facilitate disposing an inner pipeline 46 within an outer pipeline bore 48 of an outer pipeline 44, an inner pipe segment 78B in the inner pipeline 46 may be a flexible pipe 20 and, thus, include an inner barrier layer 26 formed to define its pipe bore 32, one or more intermediate layers 34 formed around the inner barrier layer 26 within its tubing annulus 25, and an outer barrier layer 28 formed around its tubing annulus 25. Additionally, as in the depicted example, an inner surface diameter 54 of the outer pipe segment tubing 52 in an outer pipeline 44 may be larger than the outer surface diameter 56 of inner pipe segment tubing 22 and, thus, open space 58 remains within the outer pipeline bore 48 between the outer pipeline 44 and the inner pipeline 46 after the inner pipeline 46 is disposed within the outer pipeline bore 48, for example, to facilitate detecting pipeline faults and/or pulling the inner pipeline 46 into and/or through the outer pipeline bore 48.

In particular, in some instances, an inner pipeline 46 may be pulled through an outer pipeline bore 48 of an outer pipeline 44 such that the inner pipeline 46 is terminated outside (e.g., external to) the outer pipeline 44, for example, such that an end of the inner pipeline 46 extends out axially past a corresponding end of the outer pipeline 44. However, in other instances, an inner pipeline 46 may be pulled into an outer pipeline bore 48 of an outer pipeline 44 such that the inner pipeline is terminated inside (e.g., internal to) the outer pipeline 44, for example, such that an end of the inner pipeline 46 is flush with or recessed relative to a corresponding end of the outer pipeline 44.

Figure 5:
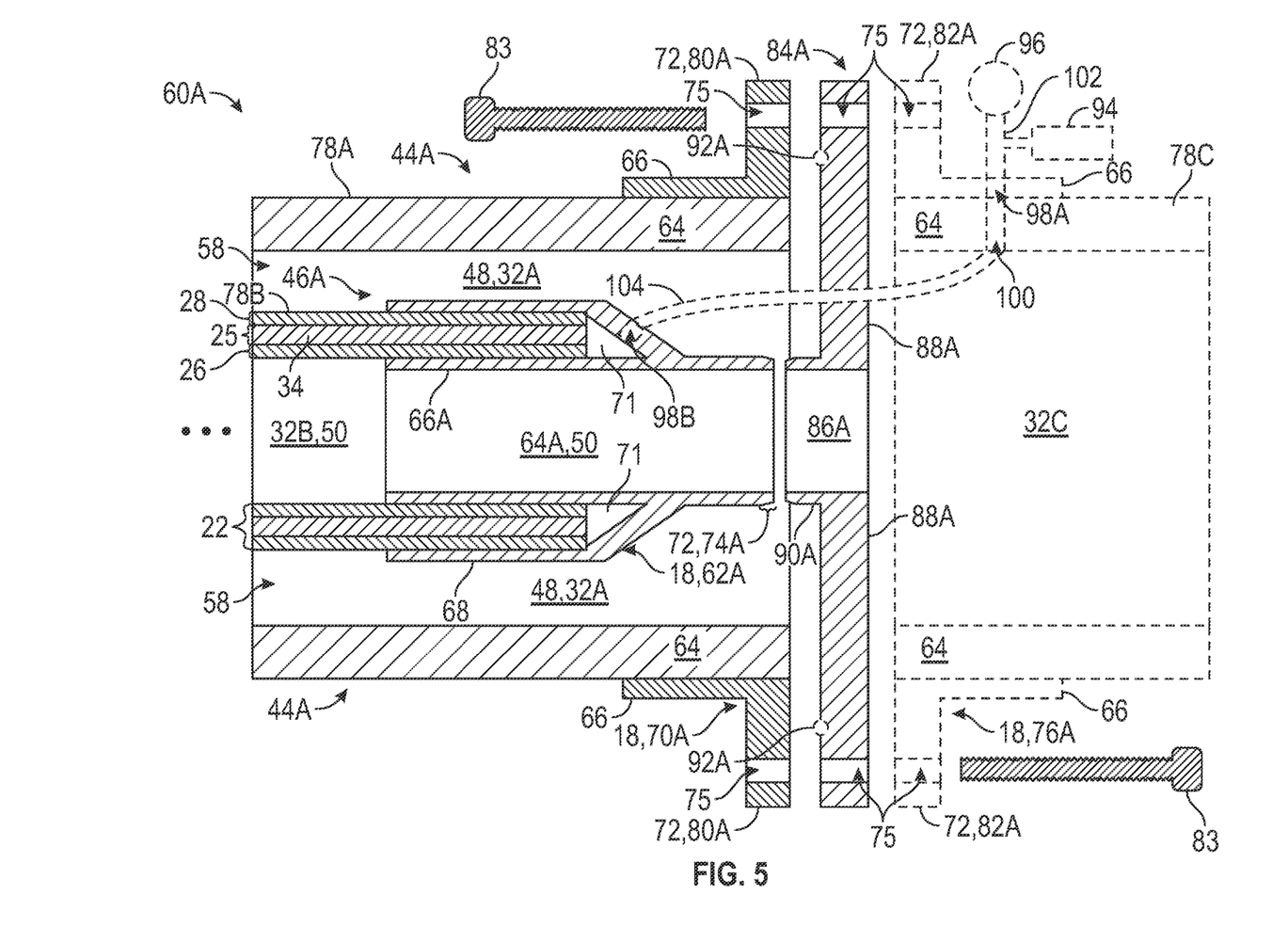
FIG. 5 is an axial cross-section of an example an end portion of a pipe-in-pipe system that includes an outer pipeline sealing mechanism, in accordance with an embodiment of the present disclosure.

To help illustrate, an example of an end portion 60A of a pipe-in-pipe system, which includes an outer (e.g., carrier and/or host) pipeline 44A and an inner (e.g., rehab) pipeline 46A, is shown in FIG. 5. As in the depicted example, in addition to an inner (e.g., rehab) pipe segment 78B, an inner pipeline 46 in a pipe-in-pipe system may include a pipe fitting 18—namely an inner (e.g., rehab) pipe fitting 62—secured to an axial end of the inner pipe segment 78B. Additionally, as in the depicted example, in addition to an outer (e.g., carrier and/or host) pipe segment 78A, an outer pipeline 44 in a pipe-in-pipe system may include a pipe fitting 18—namely an outer (e.g., carrier and/or host) pipe fitting 70—secured to an axial end of the outer pipe segment 78A. Furthermore, as in the depicted example, to facilitate connecting a pipe-in-pipe system to a bore fluid source 12 or a bore fluid destination 14, in some embodiments, a pipe fitting 18—namely a source (e.g., upstream) or drain (e.g., downstream) pipe fitting 76—may be secured to an axial end of a source (e.g., upstream) or drain (e.g., downstream) pipe segment 78, which is fluidly connected to the fluid source 12 or the fluid destination 14.

However, it should be appreciated that the depicted example is merely intended to be illustrative and not limiting. In particular, in other embodiments, a pipe-in-pipe system may be secured directly to a bore fluid source 12 or a bore fluid destination 14, for example, without using a source pipe fitting 76 and a source pipe segment 78 or without using a drain pipe fitting 76 and a drain pipe segment 78, respectively. Additionally, in other embodiments, an outer pipeline 44 may include a concentric reducer or expander connected between an outer pipe segment 78 and an outer pipe fitting 70 at the axial end of the outer pipeline 44 and, thus, the outer pipe fitting 70 may not be secured directly to the outer pipe segment 78, for example, to facilitate accounting for the size of a corresponding inner pipe fitting 62

In any case, as in the depicted example, a pipe fitting 18 generally includes a fitting body (e.g., tube) 66, which is secured to a corresponding pipe segment 78 and defines a fitting bore 64 through the pipe fitting 18. In particular, in the depicted example, the source or drain pipe fitting 76A is a slip-on pipe fitting 18 and, thus, secured (e.g., welded) circumferentially around an axial end of the source or drain pipe segment 78C. Similarly, in the depicted example, the outer pipe fitting 70A is a slip-on pipe fitting 18 and, thus, secured (e.g., welded) circumferentially around an axial end of the outer pipe segment 78A. In particular, as in the depicted example, in some embodiments, an outer pipe fitting 70 may be secured to an outer pipe segment 78 in an outer pipeline 44 such that the outer pipe fitting 70 does not extend axially beyond the outer pipe segment 78 and, thus, the outer pipeline bore 48 of the outer pipeline 44 may not include the outer fitting bore 64 of the outer pipe fitting 70.

On the other hand, in the depicted example, the inner pipe fitting 62A is a swaged pipe fitting 18. As in the depicted example, to facilitate securing its fitting body 66 to a pipe segment 78, a swaged pipe fitting 18 may additionally include a fitting jacket 68, which is connected (e.g., secured) circumferentially to the fitting body 66 such that it extends axially along the fitting body 66 to define a tubing cavity 71 in which tubing of the pipe segment 78 is to be secured and sealed. In particular, in the depicted example, the inner pipe fitting 62 is shown in a swaged (e.g., secured) state that results after its fitting jacket 68 is conformally deformed (e.g., swaged) around the tubing 22 of the inner pipe segment 78B such that the fitting jacket 68 and the fitting body 66A of the inner pipe fitting 62A circumferentially engage the tubing 22 of the inner pipe segment 78B.

Additionally, as in the depicted example, in some embodiments, an inner pipe fitting 62 in an inner pipeline 46 may be secured to a corresponding inner pipe segment 78B such that the inner pipe fitting 62 extends axially beyond the inner pipe segment 78B, thereby extending the inner pipeline bore 50 of the inner pipeline 46. In other words, in the depicted example, the inner pipeline bore 50 of the inner pipeline 46A may include the pipe bore 32B of the inner pipe segment 78B as well as the fitting bore 64A of the inner pipe fitting 62A. Furthermore, in the depicted example, the inner pipeline 46A is disposed within the outer pipeline bore 48 of the outer pipeline 44A such that the inner pipe fitting 62A and, thus, the inner pipeline 46A terminate within (e.g., internal to) the outer pipeline 44A, for example, such that the inner pipe fitting 62 is flush with or recessed relative to the axial end of the outer pipeline 44.

However, it should again be appreciated that the depicted example is merely intended to be illustrative and not limiting. In particular, in other embodiments, an inner pipe fitting 62 in an inner pipeline 46 may be a different type of pipe fitting 18, for example, a slip-on pipe fitting 18 or another type of non-swaged pipe fitting 18. Additionally, in other embodiments, an outer pipe fitting 70 in an outer pipeline 44 may be a different type of pipe fitting 18, for example, a swaged pipe fitting 18. Furthermore, in other embodiments, an outer pipe fitting 70 in an outer pipeline 44 may be secured to a corresponding outer pipe segment 78A such that the outer pipe fitting 70 extends axially beyond the outer pipe segment 78A and, thus, the outer pipeline bore 48 of the outer pipeline 44 may include the fitting bore 64 of the outer pipe fitting 70.

In any case, as in the depicted example, to facilitate connection to a bore fluid source 12, a bore fluid destination 14, or another pipe fitting 18, in some embodiments, a pipe fitting (e.g., pipe end fitting) 18 may additionally include a fitting connector 72, which is secured (e.g., welded and/or locked) to or otherwise integrated with its fitting body 66. In particular, in the depicted example, a fitting connector 72 of the inner pipe fitting 62A—namely an inner fitting connector 74A—is a weld neck fitting connector 72. On the other hand, in the depicted example, a fitting connector 72 of the outer pipe fitting 70A—namely an outer fitting connector 80A—is a flange fitting connector 72, which includes fastener openings 75 formed axially therethrough. Similarly, in the depicted example, a fitting connector 72 of the source or drain pipe fitting 76A—namely a source or drain fitting connector 82A—is a flange fitting connector 72, which includes fastener openings 75 formed axially therethrough. Accordingly, in the depicted example, the outer pipe fitting 70A and, thus, the outer pipeline 44A may be secured to the source or drain pipe fitting 76A and, thus, the source or drain pipe segment 78C at least in part by tightening threaded fasteners 83, such as bolts and/or screws, within corresponding (e.g., axially aligned) fastener openings 73 in the outer fitting connector 80A of the outer pipe fitting 70A and the source or drain fitting connector 82A of the source or drain pipe fitting 76A.

Additionally, as in the depicted example, at least in some instances, open space 58 may remain between an outer pipeline 44 and an inner pipeline 46 disposed within its outer pipeline bore 48, for example, to facilitate pulling the inner pipeline 46 into the outer pipeline 44 and/or detecting pipeline faults. In other words, in the depicted example, securing the outer pipe fitting 70A and the source or drain pipe fitting 76A directly to one another may enable fluid flow between the outer pipeline bore 48 of the outer pipeline 44A and the pipe bore 32C of the source or drain pipe segment 78C.

However, at least in some instances, it may be beneficial and/or advantageous to seal an outer pipeline bore 48 of an outer pipeline 44 around a corresponding inner pipeline 46 disposed therein, for example, to block an outer pipeline 44 from inadvertently contaminating a corresponding inner pipeline 35, to facilitate testing or monitoring integrity of the inner pipeline 46, and/or due to a corresponding pipe-in-pipe system being regulated by Pipeline and Hazardous Materials Safety Administration (PHMSA). Accordingly, the present disclosure describes an outer pipeline sealing mechanism (e.g., assembly and/or apparatus) 84 as well as techniques for implementing (e.g., manufacturing) and/or deploying (e.g., installing) an outer pipeline sealing mechanism 84.

As in the depicted example, to facilitate fluidly connecting an inner pipeline bore 50 of an inner pipeline 46 to a bore fluid source 12 or a bore fluid destination 14, an outer pipeline sealing mechanism 84 may generally include a pass-through bore 86 formed (e.g., implemented, drilled, milled, molded, cast, and/or forged) therethrough. Additionally, as in the depicted example, to facilitate sealing an inner pipeline bore 50 of an inner pipeline 46 as well as external environmental conditions from an outer pipeline bore 48 of a corresponding outer pipeline 44, in some embodiments, an outer pipeline sealing mechanism 84 may generally include a sealing plate 88 and a sealing stem 90, which is connected (e.g., secured) to the sealing plate 88 such that it extends out axially from the sealing plate 88 toward the inner pipeline 46 (e.g., into outer pipeline bore 38 of outer pipeline 44). In particular, in the depicted example, since the inner fitting connector 74A at the axial end of the inner pipeline 46A is a weld neck, to facilitate securing the outer pipeline sealing mechanism 84A to the inner pipeline 46A such that the inner pipeline bore 50 is sealed from the outer pipeline bore 48, the sealing stem 90A of the outer pipeline sealing mechanism 84 includes a weld neck, which may be welded to the inner fitting connector 74A.

Additionally, as in the depicted example, to facilitate securing an outer pipeline sealing mechanism 84 to an outer pipeline 44 such that the outer pipeline bore 48 of the outer pipeline 44 is sealed from external environmental conditions, in some embodiments, a sealing plate 88 of the outer pipeline sealing mechanism 84 may be formed (e.g., implemented, molded, milled, cast, and/or forged) to circumferentially engage an axial face of a corresponding outer pipe fitting 80 in the outer pipeline 44. In particular, in the depicted example, since the outer fitting connector 80A at the axial end of the outer pipeline 44A is a flange fitting connector 72 with fastener openings 75 formed axially therethrough, the sealing plate 88A also includes fasteners openings 75, which can be axially aligned with the fastener openings 75 in the outer fitting connector 80A, formed therethrough. Accordingly, in the depicted example, tightening threaded fasteners 83, such as bolts or screws, in corresponding fastener openings 75 in the outer fitting connector 80A and the sealing plate 88A may pull the outer pipe fitting 70A and the outer pipeline sealing mechanism 84A toward one another, for example, such that the outer fitting connector 80A and the sealing plate 88A directly abut one another, which at least in some instances, may facilitate securing the outer pipeline sealing mechanism 84A to the outer pipeline 44A such that the outer pipeline bore 48 of the outer pipeline 44A is sealed from external environmental conditions.

Nevertheless, as in the depicted example, to facilitate improving sealing integrity, in some embodiments, an outer pipeline sealing mechanism 84 may additionally include one or more discrete seals 92, such as a gasket or an O-ring. In particular, in the depicted example, the outer pipeline sealing mechanism 84 includes a discrete seal 92, which is to be compressed axially between the outer fitting connector 80A in the outer pipeline 44A and the sealing plate 88A of the outer pipeline sealing mechanism 84A to facilitate sealing the outer pipeline bore 48 of the outer pipeline 44A from external environmental conditions.

However, it should again be appreciated that the depicted example is merely intended to be illustrative and not limiting. In particular, in other embodiments, an outer pipeline sealing mechanism 84 may not include a discrete seal 92, for example, when engagement between an outer pipeline 44 and the sealing plate 88 of the outer pipeline sealing mechanism 84 is expected to be sufficient to seal the outer pipeline bore 48 of the outer pipeline 44 from external environmental conditions and engagement between an inner pipeline 46 and the sealing stem 90 of the outer pipeline sealing mechanism 84 is expected to be sufficient to seal the inner pipeline bore 50 of the inner pipeline bore 50 from the outer pipeline bore 48.

In any case, as described above, in some embodiments, intermediate layers 34 in a pipe segment 78 may define one or more annular fluid conduits 24 within the tubing annulus 25 of the pipe segment 78. As in the depicted example, to facilitate venting the tubing annulus 25 of a pipe segment 78 and, thus, reducing likelihood of the tubing annulus 25 becoming over pressurized, in some embodiments, a vent valve 94 may be fluidly connected to the tubing annulus 25. Additionally, as in the depicted example, in some embodiments, a fluid parameter sensor 96 may be fluidly connected to the tubing annulus 25 of a pipe segment 78 to enable determination (e.g., measurement and/or sensing) of fluid parameters, such as fluid pressure, fluid temperature, and/or fluid composition, associated with fluid in the tubing annulus 25 of the pipe segment 78, for example, to facilitate monitoring operation of and/or detecting faults in a corresponding pipeline 10.

In particular, in the depicted example, the fluid parameter sensor 96 and the vent valve 94 are fluidly connected to a fitting fluid port 98A, which is formed through the source or drain pipe fitting 76A and fluidly connected to a pipe fluid port 100, which is formed through the source or drain pipe segment 78C, via one or more external fluid conduits 102, such as a hose. Additionally, in the depicted example, the pipe fluid port 100 is fluidly connected to another fitting fluid port 98B, which is formed through the fitting jacket 68 of the inner pipe fitting 62A to the tubing cavity 71 in which the tubing 22 of the inner pipe segment 78B is secured and sealed, via one or more internal fluid conduits 104, such as a hose, that extend through the outer pipeline sealing mechanism 84A, for example, via an opening in the sealing plate 88 of the outer pipeline sealing mechanism 84A.

However, it should again be appreciated that the depicted example is merely intended to be illustrative or not limiting. In particular, in other embodiments, a vent valve 94 may be fluidly connected to the tubing annulus 25 of a pipe segment 78 while a fluid parameter sensor 96 is not or vice versa. Additionally, in other embodiments, a vent valve 94 and/or a fluid parameter sensor 96 may be fluidly connected to a fitting fluid port 98, which is formed through an outer pipe fitting 70A and fluidly connected to a pipe fluid port 100, which is formed through a corresponding outer pipe segment 78A. In other words, in other embodiments, a vent valve 94 and/or a fluid parameter sensor 96 may be implemented on a pipe-in-pipe side of a corresponding outer pipeline sealing mechanism 84, for example, instead of on a source or drain side of the outer pipeline sealing mechanism 84. Moreover, in other embodiments, an inner fitting connector 74 of an inner pipe fitting 62 may not be a weld neck fitting connector 72, for example, instead being a flange fitting connector 72.

Figure 6:
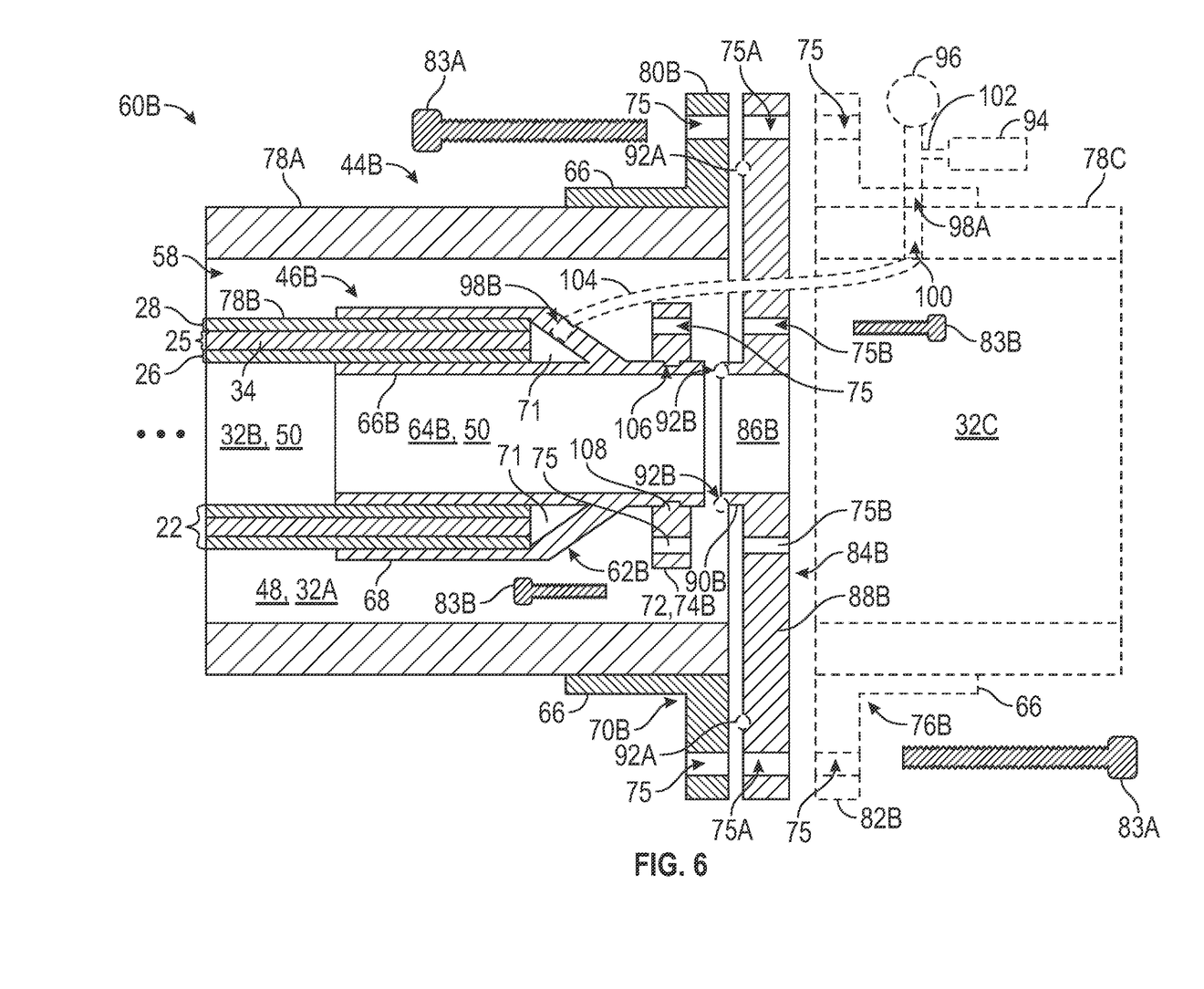
FIG. 6 is an axial cross-section of another example of an end portion of a pipe-in-pipe system that includes an outer pipeline sealing mechanism, in accordance with an embodiment of the present disclosure.

To help illustrate, another example of an end portion 60B of a pipe-in-pipe system, which includes an outer pipeline 44B, an inner pipeline 46B, and an outer pipeline sealing mechanism 84B, is shown in FIG. 6. Similar to the outer pipeline 44A of FIG. 5, the outer pipeline 44B of FIG. 6 generally includes an outer pipe segment 78A and an outer pipe fitting 70B, which is secured to an axial end of the outer pipe segment 78A and includes an outer (e.g., flange, host, and/or carrier) fitting connector 80B. Additionally, similar to the inner pipeline 46A of FIG. 5, the inner pipeline 46B of FIG. 6 generally includes an inner pipe segment 78B and an inner pipe fitting 62B, which is secured to an axial end of the inner pipe segment 78B. In particular, similar to the inner pipe fitting 62A of FIG. 5, the inner pipe fitting 62B of FIG. 6 generally includes a fitting body 66B, which defines its fitting bore 64B, a fitting jacket 68, which is connected (e.g., secured) to the fitting body 66B to define a tubing cavity 71 in which the tubing 22 of the inner pipe segment 78B is secured and sealed, and an inner fitting connector 74B, which is secured to the fitting body 66B.

However, as depicted in FIG. 6, the inner fitting connector 74B of the inner pipe fitting 62B is a flange fitting connector 72 that includes fastener openings 75 axially formed therethrough, for example, instead of a weld neck fitting connector 72. In particular, in the depicted example, the inner fitting connector 74B is rotatably (e.g., swivelably) secured to the fitting body 66B. As in the depicted example, to facilitate securing a fitting connector 72 to a fitting body 66 such that the fitting connector 72 is rotatable (e.g., swivelable) relative to the fitting body 66, in some embodiments, an outer surface of the fitting body 66 may include a securement notch 106 while an inner surface of the fitting connector 72 may include a securement tab 108, which fits within (e.g., interlocks with) the securement notch 106.

Nevertheless, it should be appreciated that the depicted example is merely intended to be illustrative and not limiting. In particular, to facilitate securing a fitting connector 72 to a fitting body 66 such that the fitting connector 72 is rotatable (e.g., swivelable) relative to the fitting body 66, in other embodiments, an inner surface of the fitting connector 72 may include a securement notch 106 while an outer surface of the fitting body 66 may include a securement tab 108, which fits within (e.g., interlocks with) the securement notch 106.

In any case, similar to FIG. 5, the outer pipeline sealing mechanism 84B may be secured to the inner pipe fitting 62B in the inner pipeline 46B and the outer pipe fitting 70B in the outer pipeline 44B of FIG. 6 to facilitate terminating the inner pipeline 46B within (e.g., internal to) the outer pipeline 44B such that the outer pipeline bore 48 of the outer pipeline 44B is sealed around the inner pipeline 46B. In particular, similar to the outer pipeline sealing mechanism 84A of FIG. 5, the outer pipeline sealing mechanism 84B of FIG. 6 generally includes a sealing plate 88B and a sealing stem 90B, which is connected (e.g., secured) to the sealing plate 88B such that it extends out axially from the sealing plate 88B toward the inner pipeline 46B (e.g., into the outer pipeline bore 48 of the outer pipeline 44B).

More specifically, similar to FIG. 5, since the outer fitting connector 80B at the axial end of the outer pipeline 44B is a flange fitting connector 72 with fastener openings 75 formed axially therethrough, to facilitate securing the outer pipeline sealing mechanism 84B to the outer pipeline 44B such that the outer pipeline bore 48 of the outer pipeline 44B is sealed from external environmental conditions, the sealing plate 88B of FIG. 6 also includes first (e.g., outer) fasteners openings 75A, which can be axially aligned with the fastener openings 75 in the outer fitting connector 80B, for example, in addition to being axially aligned with fastener openings 75 in a source or drain fitting connector 82B of a corresponding source or drain pipe fitting 76B. Accordingly, similar to FIG. 5, tightening first (e.g., outer) threaded fasteners 83A, such as bolts or screws, in corresponding fastener openings 75 in the outer fitting connector 80B and the sealing plate 88B of FIG. 6 may pull the outer pipe fitting 70B and the outer pipeline sealing mechanism 84B toward one another, for example, such that the outer fitting connector 80B and the sealing plate 88B directly abut one another, which at least in some instances, may facilitate securing the outer pipeline sealing mechanism 84B to the outer pipeline 44B such that the outer pipeline bore 48 of the outer pipeline 44B is sealed from external environmental conditions.

However, as in the depicted example, when an inner fitting connector 74 at an axial end of an inner pipeline 46, which is disposed and terminated within an outer pipeline bore 48 of an outer pipeline 44, is a rotatable flange fitting connector 72, to facilitate securing an outer pipeline sealing mechanism 84 to the inner pipeline 46 such that the inner pipeline bore 50 of the inner pipeline 46 is sealed from the outer pipeline bore 48, in some embodiments, the outer pipeline sealing mechanism 84 may additionally include second (e.g., other and/or inner) fastener openings 75B, which can be axially aligned with the fastener openings 75 in the inner fitting connector 74. In other words, in the example depicted in FIG. 6, tightening second (e.g., other and/or inner) threaded fasteners 83B, such as bolts or screws, in corresponding (e.g., axially aligned) fastener openings 75 in the inner fitting connector 74B and the sealing plate 88B may pull the inner pipe fitting 62B and the outer pipeline sealing mechanism 84B toward one another, for example, such that the fitting body 66B of the inner pipe fitting 62B and the sealing stem 90B of the outer pipeline sealing mechanism 84B directly abut one another, which at least in some instances, may facilitate securing the outer pipeline sealing mechanism 84B to the inner pipeline 46B such that the inner pipeline bore 50 of the inner pipeline 46B is sealed from the outer pipeline bore 48 of the outer pipeline 44B.

Nevertheless, as mentioned above, to facilitate improving sealing integrity, in some embodiments, an outer pipeline sealing mechanism 84 may additionally include one or more discrete seals 92, such as a gasket or an O-ring. In particular, similar to the outer pipeline sealing mechanism 84A of FIG. 5, the outer pipeline sealing mechanism 84B of FIG. 6 includes a first (e.g., outer) discrete seal 92A, which is to be compressed axially between the sealing plate 88B of the outer pipeline sealing mechanism 84B and the outer fitting connector 80B at the axial end of the outer pipeline 44B to facilitate sealing the outer pipeline bore 48 from external environmental conditions. To facilitate sealing the inner pipeline bore 50 of an inner pipeline 46, which is disposed within an outer pipeline bore 48 of an outer pipeline 44, from the outer pipeline bore 48, the outer pipeline sealing mechanism 84B additionally includes a second (e.g., another and/or inner) discrete seal 92B, which is to be compressed axially between the sealing stem 90B of the outer pipeline sealing mechanism 84B and an axial end of the fitting body 66B in the inner pipeline 46B.

However, it should again be appreciated that the depicted example is merely intended to be illustrative and not limiting. In particular, in other embodiments, to facilitate sealing out external environmental conditions, an outer pipeline sealing mechanism 84 may additionally or alternatively include a discrete seal 92, which is to be compressed axially between the sealing plate 88 of the outer pipeline sealing mechanism 84 and a source or drain fitting connector 82 of a source or drain pipe fitting 76. Additionally, in other embodiments, instead of being secured directly to an outer pipe fitting 70 in an outer pipeline 44, a source or drain pipe fitting 76 may be secured directly to an inner pipe fitting 62 in an inner pipeline 46, which is disposed within the outer pipeline bore 48 of the outer pipeline 44, for example, when the source or drain pipe fitting 76 has a smaller diameter than the outer pipe fitting 70 and/or a corresponding source or drain pipe segment 78 has a smaller diameter than an outer pipe segment 78 secured to the outer pipe fitting 70.

Figure 7:
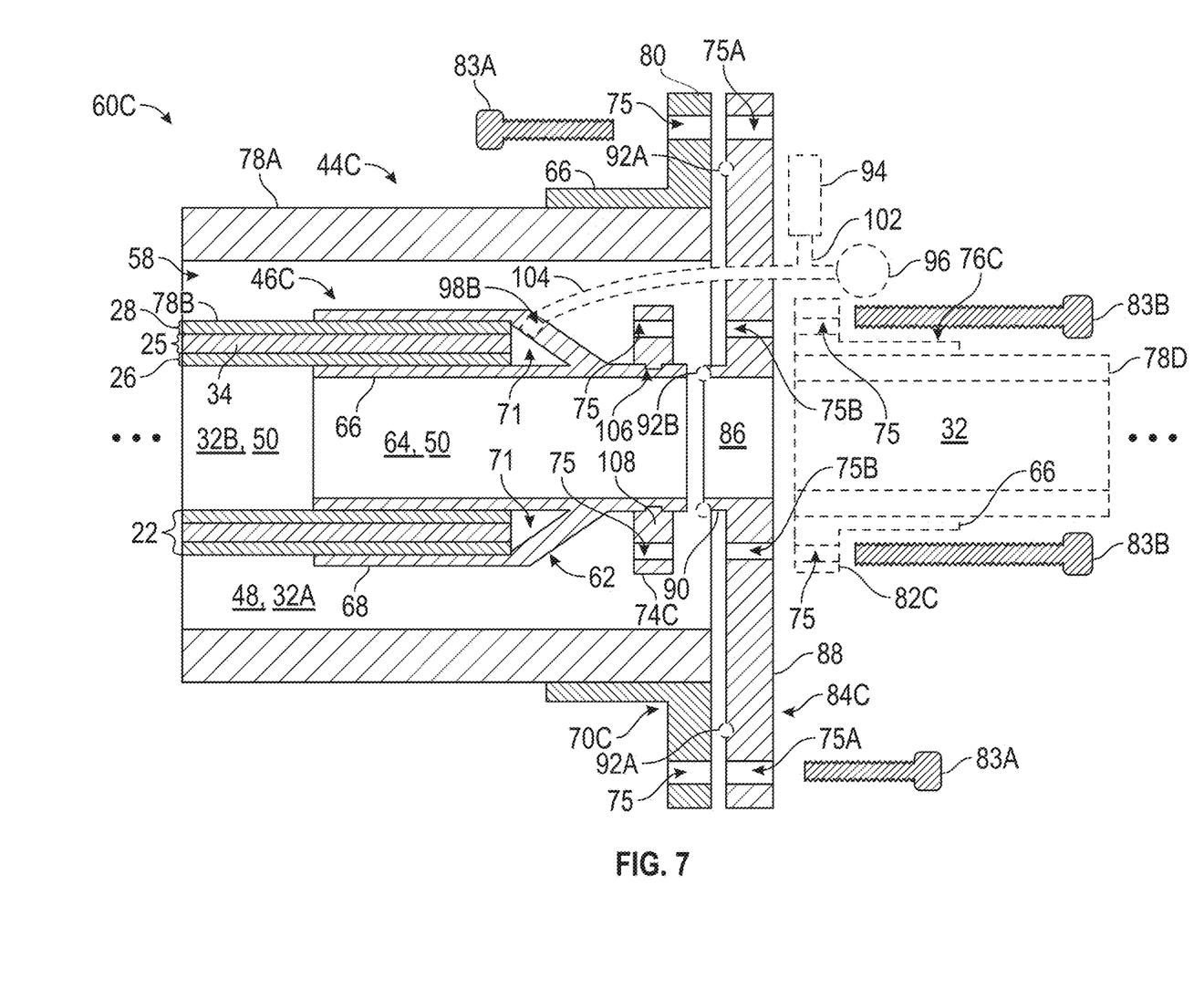
FIG. 7 is an axial cross-section of a further example of an end portion of a pipe-in-pipe system that includes an outer pipeline sealing mechanism, in accordance with an embodiment of the present disclosure.

To help illustrate, a further example of an end portion 60C of a pipe-in-pipe system, which generally matches the end portion 60B shown in FIG. 6 and, thus, includes an outer pipeline 44C, an inner pipeline 46C, and an outer pipeline sealing mechanism 84C, is shown in FIG. 7. However, as depicted in FIG. 7, the diameter of the outer pipe segment 78A in the outer pipeline 44C is substantially larger than the diameter of a corresponding source or drain pipe segment 78D and, thus, the diameter of the outer pipe fitting 70C secured to the outer pipe segment 78A is substantially larger than the diameter of a corresponding source or drain pipe fitting 76C secured to the source or drain pipe segment 78D. Nevertheless, in the depicted example, the source or drain fitting connector 82C of the source or drain pipe fitting 76C is a flange fitting connector 72 that includes fastener openings 75, which can be axially aligned with the fastener openings 75 in the inner fitting connector 74C at the axial end of the inner pipeline 46C as well as second (e.g., inner) fastener openings 75B in the sealing plate 88C of the outer pipeline sealing mechanism 84C. In other words, in the example depicted in FIG. 7, tightening second threaded fasteners 83B, such as bolts or screws, in corresponding fastener openings 75 in the inner fitting connector 74C, the sealing plate 88C, and the source or drain fitting connector 82C may facilitate securing the source or drain pipe fitting 76C to the pipe-in-pipe system, for example, in addition to securing the outer pipeline sealing mechanism 84C to the inner pipeline 46C.

Nevertheless, it should be appreciated that the depicted example is merely intended to be illustrative and not limiting. In particular, as mentioned above, in other embodiments, to facilitate sealing out external environmental conditions, an outer pipeline sealing mechanism 84 may additionally or alternatively include a discrete seal 92, which is to be compressed axially between the sealing plate 88 of the outer pipeline sealing mechanism 84 and a source or drain fitting connector 82 of a source or drain pipe fitting 76. Additionally, in other embodiments, an outer pipeline sealing mechanism 84 may not be pre-fabricated (e.g., pre-formed), for example, instead being formed in-situ (e.g., on-demand).

Figure 8:
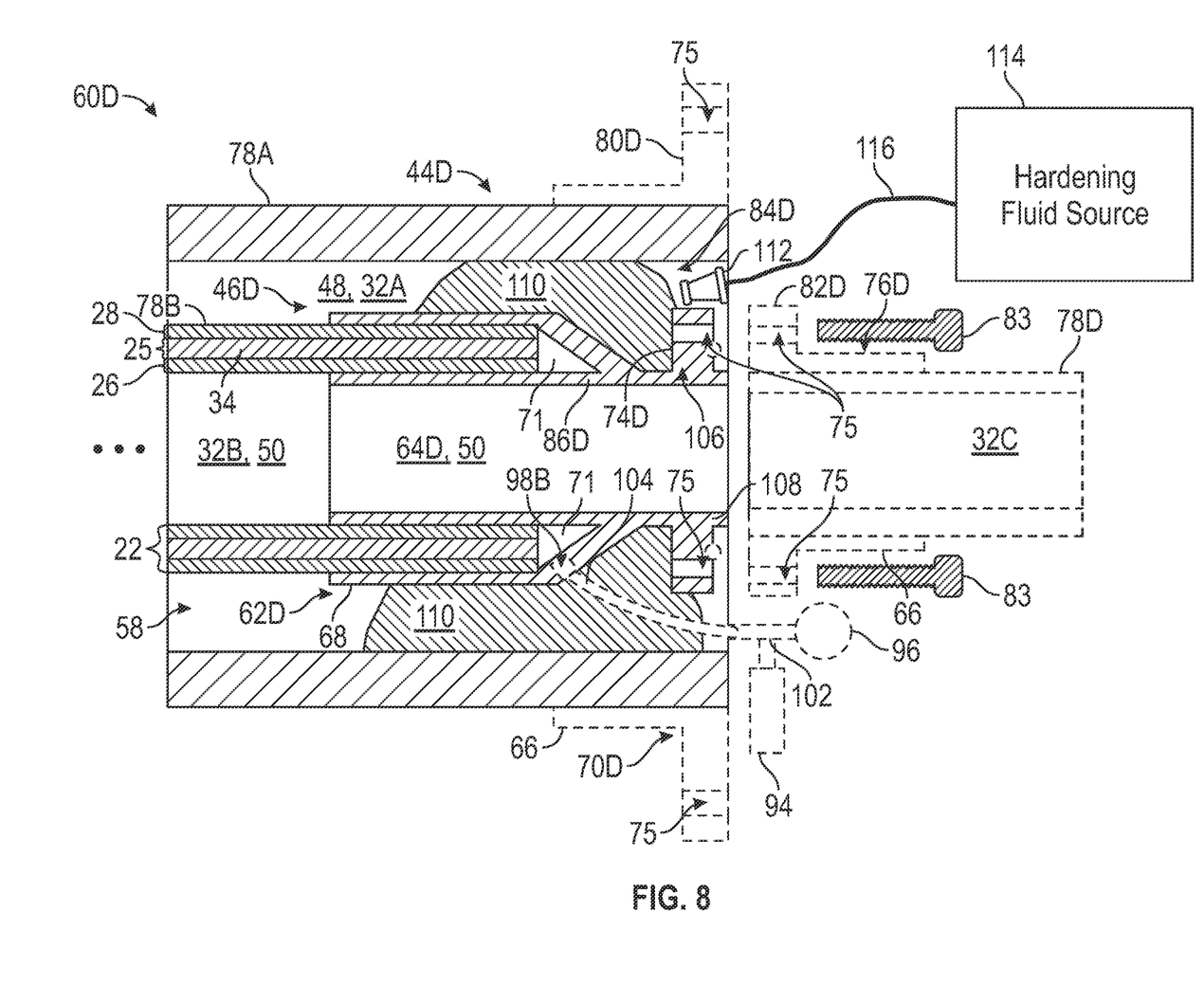
FIG. 8 is an axial cross-section of another example of an end portion of a pipe-in-pipe system that includes an outer pipeline sealing mechanism, in accordance with an embodiment of the present disclosure.

To help illustrate, another example of an end portion 60D of a pipe-in-pipe system, which includes an outer pipeline 44D, an inner pipeline 46D, and an outer pipeline sealing mechanism 84D, is shown in FIG. 8. As in the depicted example, to facilitate sealing an outer pipeline bore 48 of an outer pipeline 44 from external environmental conditions as well as an inner pipeline bore 50 of a corresponding inner pipeline 46, in some embodiments, an outer pipeline sealing mechanism 84 may include hardening material 110 disposed within the outer pipeline bore 48 such that the hardening material 110 circumferentially engages an inner surface of the outer pipeline 44 and an outer surface of the inner pipeline 46. In particular, as in the depicted example, to facilitate terminating an inner pipeline 46 within an outer pipeline bore 48 of an outer pipeline 44 while circumferentially engaging the inner pipeline 46 and, thus, sealing the inner pipeline bore 50 of the inner pipeline 46 from the outer pipeline bore 48 of the outer pipeline 44, the hardening material 110 may be contoured (e.g., conform) to an outer surface of an inner pipe fitting 62 at an axial end of the inner pipeline 46.

Since, as in the depicted example, the outer surface diameter of an inner pipe fitting 62 may non-monotonically change (e.g., increase and decrease) over its length (e.g., due to its fitting jacket 68 and/or its inner fitting connector 74), in some embodiments, to facilitate contouring hardening material 110 to the inner pipe fitting 62, the hardening material 110 may initially be disposed around the inner pipe fitting 62 while in a fluid state before being transitioned (e.g., hardened, cured, and/or solidified) to a solid (e.g., cured and/or hardened) state. Thus, in some embodiments, hardening material 110 used in an outer pipeline sealing mechanism 84 may include epoxy, resin, and/or the like. Additionally, as in the depicted example, to facilitate disposing hardening material 110 around an inner pipe fitting 62 while in a fluid state, a hardening material fluid nozzle 112 may be fluidly connected to a hardening fluid source (e.g., pump and/or reservoir) 114 via one or more hardening material fluid conduits 116.

However, it should be appreciated that the depicted example is merely intended to be illustrative and not limiting. In particular, in other embodiments, hardening material 110 used in an outer pipeline sealing mechanism 84 may be in a solid state before being disposed circumferentially around an inner pipe fitting 62, for example, when the inner pipe fitting 62 has a uniform cylindrical outer surface diameter or a monotonically changing (e.g., increasing or decreasing) outer surface diameter. Additionally, in other embodiments, hardening material 110 used in an outer pipeline sealing mechanism 84 may extend around an inner pipe fitting 62 in a corresponding inner pipeline 46 as well as around at least a portion of an inner pipe segment 78B secured to the inner pipe fitting 62. Furthermore, in other embodiments, an inner fitting connector 74 of an inner pipe fitting 62 may be a different type of fitting connector 72, for example, a fixed flange fitting connector 72 that is not rotatable relative to the fitting body 66 of the inner pipe fitting 62. Moreover, in other embodiments, an outer pipeline sealing mechanism 84 used in a pipe-in-pipe system may not be a discrete component, for example, instead being integrated with an inner pipe fitting 62 in the pipe-in-pipe system.

Figure 9:
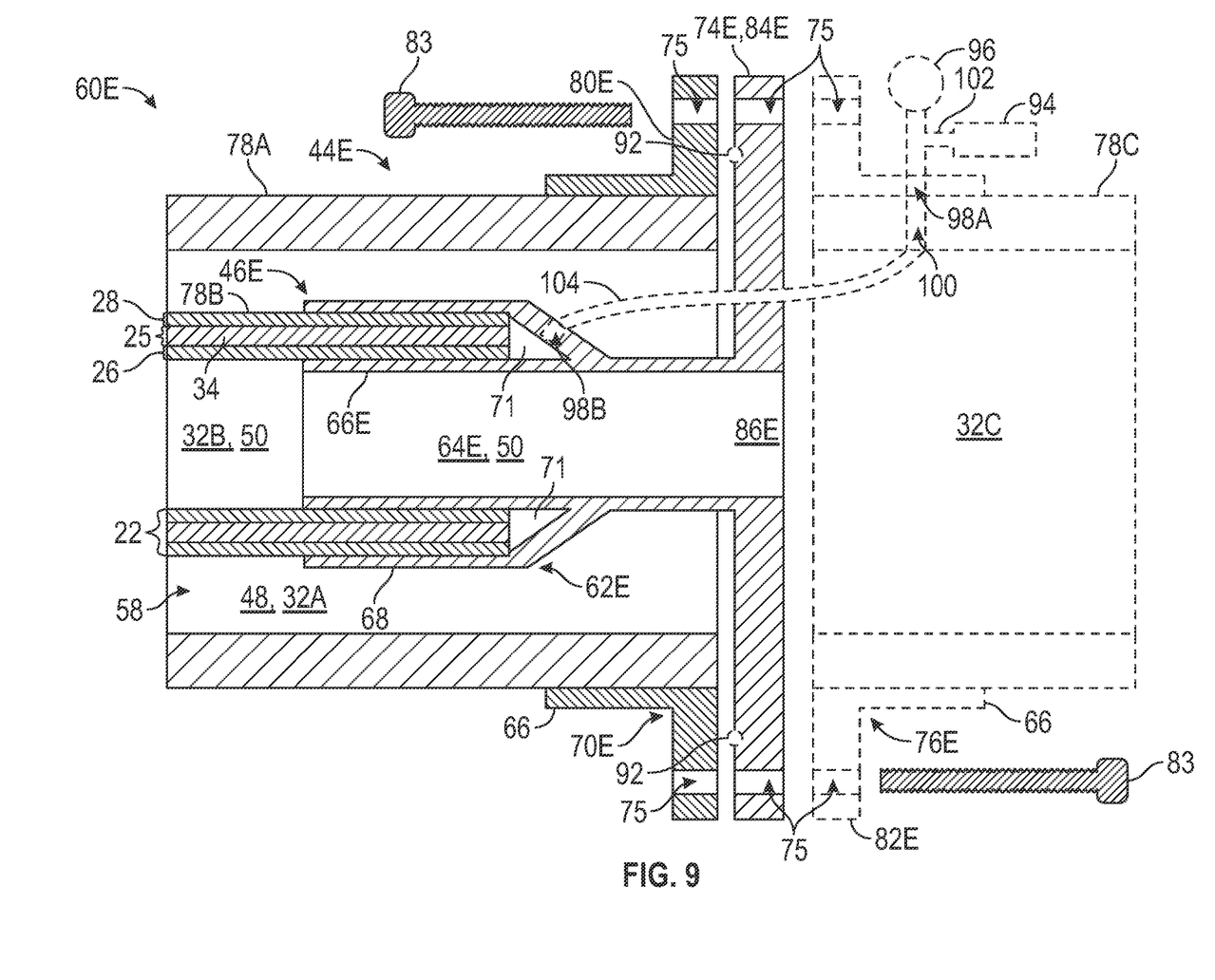
FIG. 9 is an axial cross-section of a further example of an end portion of a pipe-in-pipe system, in accordance with an embodiment of the present disclosure.

To help illustrate, a further example of an end portion 60E of a pipe-in-pipe system, which includes an outer pipeline 44E and an inner pipeline 46E, is shown in FIG. 9. Similar to the outer pipelines 44 of FIGS. 5-7, the outer pipeline 44E of FIG. 9 generally includes an outer pipe segment 78A and an outer pipe fitting 70E, which is secured to an axial end of the outer pipe segment 78A and includes an outer (e.g., flange, host, and/or carrier) fitting connector 80E. Additionally, similar to the inner pipelines 46 of FIGS. 5-8, the inner pipeline 46E of FIG. 9 generally includes an inner pipe segment 78B and an inner pipe fitting 62E, which is secured to an axial end of the inner pipe segment 78B. In particular, similar to the inner pipe fittings 62 of FIGS. 5-8, the inner pipe fitting 62E of FIG. 9 generally includes a fitting body 66E, which defines its fitting bore 64B, a fitting jacket 68, which is connected (e.g., secured) to the fitting body 66B to define a tubing cavity 71 in which the tubing 22 of the inner pipe segment 78B is secured and sealed, and an inner fitting connector 74E, which is connected to the fitting body 66E.

However, as depicted in FIG. 9, the inner fitting connector 74E of the inner pipe fitting 62E is a fixed flange fitting connector 72, which is not rotatable relative to the fitting body 66E of the inner pipe fitting 62E. In particular, in some such embodiments, a fixed flange fitting connector 72 may initially be formed as a discrete component before being secured (e.g., welded) to a corresponding fitting body 66. In other such embodiments, a fitting body 66 and a fixed flange fitting connector 72 may be formed (e.g., implemented, milled, molded, cast, and/or forged) as an integrated unit. In any case, when fixed circumferentially to a corresponding fitting body 66, a flange inner fitting connector 74 of an inner pipe fitting 62 may facilitate automatically sealing the fitting bore 64 of the inner pipe fitting 62 and, thus, an inner pipeline bore 50 of an inner pipeline 46, which is disposed within an outer pipeline bore 48 of an outer pipeline 44, from the outer pipeline bore 48, for example, to obviate use of a discrete seal 92.

Additionally, as compared to the inner fitting connectors 74 of FIGS. 5-8, the outer surface diameter of the inner fitting connector 74E in FIG. 9 is substantially larger (e.g., oversized). In particular, in the depicted example, the larger outer surface diameter enables fastener openings 75 formed through the inner fitting connector 74E to be axially aligned with fastener openings 75 in the outer fitting connector 80E of the outer pipe fitting 70E.

Accordingly, in example depicted in FIG. 9, tightening threaded fasteners 83, such as bolts or screws, in corresponding fastener openings 75 in the outer fitting connector 80E and the inner fitting connector 74E may pull the outer fitting connector 80E and the inner fitting connector 74E toward one another, for example, such that they directly abut, which, at least in some instances, may facilitate securing the inner pipeline 46E to the outer pipeline 44E such that the outer pipeline bore 48 of the outer pipeline 44E is sealed from external environmental conditions. In other words, in such embodiments, an inner fitting connector 74 of an inner pipe fitting 62 in an inner pipeline 46 may be directly used to facilitate sealing the outer pipeline bore 48 of a corresponding outer pipeline 44 around the inner pipeline 46 and, thus, the inner pipe fitting 62 may include an integrated outer pipeline sealing mechanism 84.

In this manner, the present disclosure describes an outer pipeline sealing mechanism (e.g., assembly and/or apparatus) 84 that facilitates sealing an outer pipeline bore 48 of an outer pipeline 44 around a corresponding inner pipeline 46 disposed therein, which, at least in some instances, may be beneficial and/or advantageous, for example, to block the outer pipeline 44 from inadvertently contaminating the inner pipeline 46, to facilitate testing or monitoring integrity of the inner pipeline 46, and/or due to the corresponding pipe-in-pipe system being regulated by Pipeline and Hazardous Materials Safety Administration (PHMSA).

What is claimed is:

1. A system comprising:
an outer pipeline, wherein the outer pipeline comprises:
an outer pipe segment; and
an outer pipe fitting configured to be secured to an end of the outer pipe segment;
an inner pipeline configured to be disposed within an outer pipeline bore of the outer pipeline, wherein the inner pipeline comprises:
an inner pipe segment; and
an inner pipe fitting configured to be secured to another end of the inner pipe segment;
an outer pipeline sealing mechanism, wherein the outer pipeline sealing mechanism comprises:
a sealing plate configured to be secured to an outer fitting connector of the outer pipe fitting;
a sealing stem that extends out axially from the sealing plate, wherein the sealing stem is configured to be secured to the inner pipe fitting to facilitate sealing an inner pipeline bore of the inner pipeline from the outer pipeline bore of the outer pipeline; and
a seal ring configured to be compressed between the sealing plate and the outer fitting connector of the outer pipe fitting to facilitate sealing the outer pipeline bore of the outer pipeline from external environmental conditions;
a source or drain pipe segment;
a source or drain pipe fitting configured to be secured to the source or drain pipe segment and the sealing plate of the outer pipeline sealing mechanism to facilitate fluidly connecting the inner pipeline bore of the inner pipeline to a pipe bore of the source or drain pipe segment via a pass-through bore formed through the outer pipeline sealing mechanism;
a first threaded fastener configured to be secured in a first fastener opening in the outer fitting connector of the outer pipe fitting and a second fastener opening in the sealing plate of the outer pipeline sealing mechanism to facilitate securing the outer pipeline sealing mechanism to the outer pipe fitting; and
a second threaded fastener configured to be secured in a third fastener opening in a source or drain fitting connector of the source or drain pipe fitting and a fourth fastener opening in the sealing plate of the outer pipeline sealing mechanism to facilitate the source or drain pipe fitting to the outer pipeline sealing mechanism.

2. The system of claim 1, wherein the outer pipeline sealing mechanism comprises another seal ring configured to be compressed between the sealing stem of the outer pipeline sealing mechanism and the inner pipe fitting to facilitate sealing the inner pipeline bore of the inner pipeline from the outer pipeline bore of the outer pipeline.

3. The system of claim 1, comprising:
a fluid parameter sensor, a vent valve, or both configured to be fluidly connected to a first fitting fluid port formed through the source or drain pipe fitting, a pipe fluid port formed through the source or drain pipe segment, or both; and
one or more fluid conduits configured to extend through the sealing plate of the outer pipeline sealing mechanism to facilitate fluidly connecting a second fitting fluid port formed in the inner pipe fitting to the first fitting fluid port formed through the source or drain pipe fitting, the pipe fluid port formed through the source or drain pipe segment, or both and, thus, fluidly connecting the second fitting fluid port formed in the inner pipe fitting to the fluid parameter sensor, the vent valve, or both.

4. The system of claim 1, wherein the inner pipe segment in the inner pipeline comprises:
an inner barrier layer that defines a pipe bore;
an outer barrier layer formed circumferentially around the inner barrier layer; and
an intermediate layer formed between the inner barrier layer and the outer barrier layer to define a fluid conduit within a tubing annulus of the inner pipe segment.

5. The system of claim 1, wherein the inner pipe fitting in the inner pipeline comprises:
a fitting body that defines a fitting bore; and
a fitting jacket secured circumferentially around the fitting body such that the fitting jacket extends axially along the fitting body to define a tubing cavity, wherein tubing of the inner pipe segment is configured to be disposed within the tubing cavity of the inner pipe fitting; and the fitting jacket is configured to be conformally deformed around the tubing of the inner pipe segment to facilitate securing the inner pipe fitting to the inner pipe segment.

6. The system of claim 5, wherein:

the inner pipe fitting comprises a flange fitting connector that is rotatably secured to the fitting body of the inner pipe fitting; and the outer pipeline sealing mechanism comprises another seal ring configured to be compressed between the sealing stem of the outer pipeline sealing mechanism and the inner pipe fitting to facilitate sealing the inner pipeline bore of the inner pipeline from the outer pipeline bore of the outer pipeline.

7. The system of claim 1, wherein:

the inner pipe fitting comprises a first weldneck; and the sealing stem of the outer pipeline sealing mechanism comprises a second weldneck configured to be welded to the first weldneck of the inner pipe fitting to facilitate securing the outer pipeline sealing mechanism to the inner pipeline such that the inner pipeline bore of the inner pipeline is fluidly connected to a pass-through bore of the outer pipeline sealing mechanism and sealed from the outer pipeline bore of the outer pipeline.

8. The system of claim 1, wherein a first diameter of the source or drain pipe fitting is smaller than a second diameter of the outer pipe fitting, matches a third diameter of the inner pipe fitting, or both.

9. The system of claim 1, wherein:

the outer pipeline sealing mechanism comprises a pass-through bore that extends therethrough; and the outer pipeline sealing mechanism is configured to be secured between the inner pipe fitting of the inner pipeline and the source or drain fitting such that the inner pipeline bore of the inner pipeline is fluidly connected to a source or drain bore through the pass-through bore of the outer pipeline sealing mechanism.

10. The system of claim 1, wherein the second threaded fastener is configured to be secured in the third fastener opening in the source or drain fitting connector of the source or drain pipe fitting, the fourth fastener opening in the sealing plate of the outer pipeline sealing mechanism, and a fifth fastener opening in an inner fitting connector of the inner pipe fitting to facilitate securing the outer pipeline sealing mechanism between the inner pipe fitting and the source or drain pipe fitting.

11. A method of deploying an outer pipeline sealing mechanism, comprising:

securing a sealing stem of the outer pipeline sealing mechanism to an inner pipe fitting that is secured to an end of an inner pipe segment in an inner pipeline to facilitate sealing an inner pipeline bore of the inner pipeline from an outer pipeline bore of an outer pipeline, wherein:

the inner pipeline is disposed within the outer pipeline bore of the outer pipeline; and the sealing stem of the outer pipeline sealing mechanism extends out axially from a sealing plate of the outer pipeline sealing mechanism;

securing the sealing plate of the outer pipeline sealing mechanism to an outer pipe fitting that is secured to another end of an outer pipe segment in the outer pipeline such that a seal ring is compressed between an outer fitting connector of the outer pipe fitting and the sealing plate of the outer pipeline sealing mechanism to facilitate sealing the outer pipeline bore of the outer pipeline from external environmental conditions at least in part by securing a first threaded fastener in a first fastener opening in the outer fitting connector and a second fastener opening in the sealing plate; and securing the sealing plate of the outer pipeline sealing mechanism to a source or drain pipe fitting that is secured to a source or drain pipe segment at least in part by securing a second threaded fastener in a third fastener opening in a source or drain fitting connector of the source or drain pipe fitting and a fourth fastener opening in the sealing plate of the outer pipeline sealing mechanism to facilitate fluidly connecting the inner pipeline bore of the inner pipeline to a pipe bore of the source or drain pipe segment via a pass-through bore formed through the outer pipeline sealing mechanism.

12. The method of claim 11, wherein securing the sealing stem of the outer pipeline sealing mechanism to the inner pipe fitting comprises securing the sealing stem of the outer pipeline sealing mechanism to the inner pipe fitting such that another seal ring is compressed between the sealing stem and the inner pipe fitting to facilitate sealing the inner pipeline bore of the inner pipeline from the outer pipeline bore of the outer pipeline.

13. The method of claim 11, wherein securing the source or drain pipe fitting to the outer pipeline sealing mechanism comprises securing the second threaded fastener in the third fastener opening in the source or drain fitting connector of the source or drain pipe fitting, the fourth fastener opening in the sealing plate of the outer pipeline sealing mechanism, and a fifth fastener opening in an inner fitting connector of the inner pipe fitting.

14. A system comprising:

an outer pipeline, wherein the outer pipeline comprises:
an outer pipe segment; and
an outer pipe fitting configured to be secured to an end of the outer pipe segment;

an inner pipeline configured to be disposed within an outer pipeline bore of the outer pipeline, wherein the inner pipeline comprises:
an inner pipe segment; and
an inner pipe fitting configured to be secured to another end of the inner pipe segment, wherein the inner pipe fitting in the inner pipeline comprises:
a fitting body that defines a fitting bore; and
a fitting jacket secured circumferentially around the fitting body such that the fitting jacket extends axially along the fitting body to define a tubing cavity, wherein:
tubing of the inner pipe segment is configured to be disposed within the tubing cavity of the inner pipe fitting; and
the fitting jacket is configured to be conformally deformed around the tubing of the inner pipe segment to facilitate securing the inner pipe fitting to the inner pipe segment; and an outer pipeline sealing mechanism, wherein the outer pipeline sealing mechanism comprises:
a sealing plate configured to be secured to an outer fitting connector of the outer pipe fitting;
a sealing stem that extends out axially from the sealing plate, wherein the sealing stem is configured to be secured to the inner pipe fitting to facilitate sealing an inner pipeline bore of the inner pipeline from the outer pipeline bore of the outer pipeline; and a seal ring configured to be compressed between the sealing plate and the outer fitting connector of the outer pipe fitting to facilitate sealing the outer pipeline bore of the outer pipeline from external environmental conditions.

15. The system of claim 14, wherein:
the inner pipe fitting comprises a flange fitting connector that is rotatably secured to the fitting body of the inner pipe fitting; and
the outer pipeline sealing mechanism comprises another seal ring configured to be compressed between the sealing stem of the outer pipeline sealing mechanism and the inner pipe fitting to facilitate sealing the inner pipeline bore of the inner pipeline from the outer pipeline bore of the outer pipeline.

16. The system of claim 14, comprising:
a source or drain pipe segment;
a source or drain pipe fitting configured to be secured to the source or drain pipe segment and the sealing plate of the outer pipeline sealing mechanism to facilitate fluidly connecting the inner pipeline bore of the inner pipeline to a pipe bore of the source or drain pipe segment via a pass-through bore formed through the outer pipeline sealing mechanism.

17. The system of claim 16, comprising:
a fluid parameter sensor, a vent valve, or both configured to be fluidly connected to a first fitting fluid port formed through the source or drain pipe fitting, a pipe fluid port formed through the source or drain pipe segment, or both; and
one or more fluid conduits configured to extend through the sealing plate of the outer pipeline sealing mechanism to facilitate fluidly connecting a second fitting fluid port formed in the inner pipe fitting to the first fitting fluid port formed through the source or drain pipe fitting, the pipe fluid port formed through the source or drain pipe segment, or both and, thus, fluidly connecting the second fitting fluid port formed in the inner pipe fitting to the fluid parameter sensor, the vent valve, or both.

18. The system of claim 16, wherein a first diameter of the source or drain pipe fitting is smaller than a second diameter of the outer pipe fitting, matches a third diameter of the inner pipe fitting, or both.

19. The system of claim 16, comprising:
a first threaded fastener configured to be secured in a first fastener opening in the outer fitting connector of the outer pipe fitting and a second fastener opening in the sealing plate of the outer pipeline sealing mechanism to facilitate securing the outer pipeline sealing mechanism to the outer pipe fitting; and
a second threaded fastener configured to be secured in a third fastener opening in a source or drain fitting connector of the source or drain pipe fitting and a fourth fastener opening in the sealing plate of the outer pipeline sealing mechanism to facilitate the source or drain pipe fitting to the outer pipeline sealing mechanism.

20. The system of claim 19, wherein the second threaded fastener is configured to be secured in the third fastener opening in the source or drain fitting connector of the source or drain pipe fitting, the fourth fastener opening in the sealing plate of the outer pipeline sealing mechanism, and a fifth fastener opening in an inner fitting connector of the inner pipe fitting to facilitate securing the outer pipeline sealing mechanism between the inner pipe fitting and the source or drain pipe fitting.

* * * * *